Patented Nov. 21, 1922.

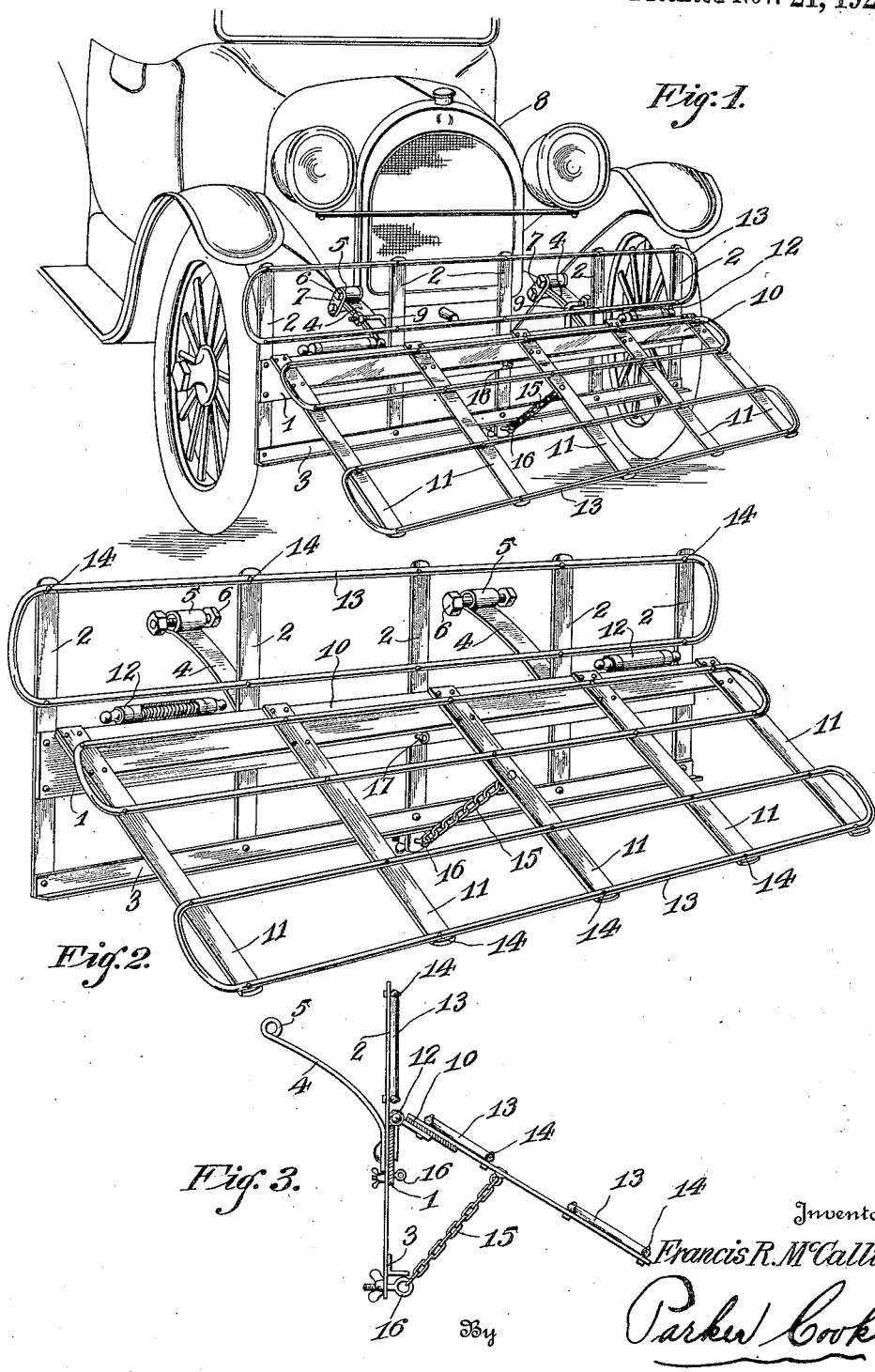

1,436,511

UNITED STATES PATENT OFFICE.

FRANCIS R. McCALLIN, OF LONG ISLAND CITY, NEW YORK.

AUTOMOBILE FENDER.

Application filed September 11, 1922. Serial No. 587,458.

*To all whom it may concern:*

Be it known that FRANCIS R. McCALLIN, a citizen of the United States of America, residing at Long Island City, in the county of Queens and State of New York, has invented certain new and useful Improvements in Automobile Fenders, of which the following is a specification.

My invention relates to new and useful improvements in fenders which are especially adapted to be applied to automobiles and trucks and has for an object to provide a fender which is so constructed that the shock or impact caused by striking a person will be taken up to a great extent and absorbed by two springs.

Another object of the invention is to provide a fender comprising in general two main parts, that is, an upright metal frame, and a swinging frame attached thereon; the attaching means being in the form of spring hinges so that the swinging frame may swing downwardly when struck to prevent the machine from passing over the body of the person and to take up the force of impact.

The invention relates in some respects to the type of fender shown in my previous patent, numbered 1,382,302 of June 21, 1921.

Still another object of my invention is to provide a fender comprising an upright frame and a spring frame on which is placed two sets of longitudinally extending bars, which may be endless in form and which may be quickly and easily renewed if they become damaged by being struck by another vehicle.

Still another object of the invention is to provide a fender, the frame of which may be made of relatively light strips on which will be placed sets of bars, which may be nickled to provide a pleasing appearance, and which bars may be readily renewed and arranged as to provide a large striking surface so that it will be impossible for a person struck by the fender to pass through or under the same.

Still another object of the invention is to provide a fender which is relatively light in weight, exceedingly simple in structure, and neat in appearance.

With these and other objects in view, the invention consists in certain new and novel constructions, and combination of parts, as will be hereinafter more fully described and pointed out in the claims.

Referring now to the drawings showing a preferred embodiment of my invention,

Fig. 1 is a fragmentary perspective of an automobile with the fender attached thereto, the fender being in its normal position.

Fig. 2 is a similar perspective of the fender showing the arms for attaching the same to the machine, and Fig. 3 is a vertical sectional view thereof.

At the outset, it might be mentioned that this fender may be applied to different styles of cars and the type shown in Fig. 1 is simply illustrative.

Referring now more in detail to the fender, it will be seen that the main or upright frame consists of a main cross bar 1, to which is bolted or riveted the upright strips 2 and the bottom rail 3, which may be of angle iron. Securely riveted to the rear of certain of the strips 2 and cross bar 1, are the two spring leaves 4, which may have the eyelets 5 formed at their outer ends through which may be passed bolt 6, and over which may be placed links 7 as shown in Fig. 1 for fastening this frame to the front springs of the automobile 8.

Yokes 9 are shown in Fig 1, but the specific form of attaching means is not a part of my invention, with the exception of the spring leaves 4, the eyelet 5 and bolt 6, as any other desirable form may be used, depending upon the type of the car to which the fender is to be attached.

Referring now to the swinging portion of the fender, it will be seen that this comprises an upper rail 10 to which is secured the outstanding strips or arms 11, the number of the arms, of course, depending upon the desired width of the fender and the number used in the upright portion of the frame.

Secured to the upper rail 10 and to the main cross-bar 1, are the two spring hinges 12 which are designed to normally keep the swinging portion of the fender in its upright position as shown in the three figures, but will allow the same to swing downwardly under compression when an object is struck. The strength of the springs should be such that they will give slowly to thereby cushion the shock when a person is struck or thrown against the fender, while the spring leaves will also tend to lessen the shock.

Referring now to another important feature of the invention, it will be seen that the upright frame together with the swinging frame are each provided with bars 13 which may be endless in form to overcome the objection of sharp ends which would otherwise be the case. These bars 13 may be attached to their relative frames by nuts and bolts 14 so that they may be easily renewed or replaced should they become damaged in service, the fender thus always appearing new and sightly and at a slight repair charge.

These bars 13 may be round in cross section and may be hollow or solid and may be nickeled, if desired, and should extend slightly beyond the sides of the main frames. In the several figures I have shown only two of these bars 13 on the swinging portion of the fender and only one on the upright portion of the fender, but a greater number may be used and their width decreased, or the bars may be of different configuration than that shown, if so desired.

There is also shown a chain 15 attached to an arm of the swinging portion of the fender and normally secured at the lower end of arm 2 of the upright portion of the frame by the lower eyelet 16. The end link of the chain may be slipped from its eyelet so that the swinging portion of the fender may be swung to an upright position when the car is to be placed in a garage or it is otherwise desired to have this portion in an upright position. An upper eyelet 16 is shown so that the lower end of the chain 15 may be attached thereto to prevent the chain from rattling should the car be run with the fender in its upright position. Thumb nuts are shown on the eyelets for slight adjustments of the chain.

The swinging portion of the fender will normally be about nine inches above the ground so that it will swing downwardly when struck to prevent a person from being run over by the machine.

The operation of the same will be clearly understood from the preceding description.

From the foregoing it will be seen that I have produced a fender which is exceedingly simple in construction, relatively light in weight, and will tend to take up the shock or force of impact when forced into operation.

Furthermore, the longitudinally extending bars may be quickly and easily replaced if they should become damaged so that the fender may always present a pleasing appearance at a relatively small cost.

Many slight changes might be made without in any way departing from the spirit and scope of my invention.

Having thus described the same, what I claim as new and desire to secure by Letters Patent is:

1. A fender adapted for use on motor vehicles comprising an upright frame, spring means for attaching same to the motor vehicle, a swinging frame and spring hinges forming the connection between said upright and said swinging frames, and adapted to normally hold the swinging frame in a partly raised position to cushion the shock of impact when said swinging frame is forced downwardly, longitudinally extending bars secured to said frames and said bars being endless in form and extending beyond the side of their respective frames.

2. A fender adapted for use on motor vehicles comprising an upright frame, spring means for attaching same to the motor vehicle, a swinging frame hingedly connected to said upright frame and spring means for normally holding the swinging frame in a partly raised position and for cushioning the shock of impact when said swinging frame is forced downwardly, auxiliary bars extending longitudinally of both of said frames endless in form and extending beyond the side of said frame and said auxiliary bars being relatively lighter in weight per foot than the weight of the metal of the frame.

In testimony whereof I affix my signature.

FRANCIS R. McCALLIN.